(12) United States Patent
Yamauchi et al.

(10) Patent No.: US 7,024,173 B2
(45) Date of Patent: Apr. 4, 2006

(54) TIMING CONTROL DEVICE AND TIMING CONTROL METHOD

(75) Inventors: Takahisa Yamauchi, Tokyo (JP); Akihiro Shibuya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 280 days.

(21) Appl. No.: 10/478,293

(22) PCT Filed: Mar. 15, 2002

(86) PCT No.: PCT/JP02/02461

§ 371 (c)(1),
(2), (4) Date: Nov. 25, 2003

(87) PCT Pub. No.: WO02/098023

PCT Pub. Date: Dec. 5, 2002

(65) Prior Publication Data

US 2004/0152438 A1    Aug. 5, 2004

(30) Foreign Application Priority Data

May 25, 2001    (JP) ............................. 2001-156966

(51) Int. Cl.
*H04B 1/16*    (2006.01)

(52) U.S. Cl. ................ 455/343.1; 455/343.2; 455/265; 455/259

(58) Field of Classification Search ............ 455/343.1, 455/343.4, 258, 260, 422.1, 574, 255, 256, 455/257, 259, 261, 262, 263, 265
See application file for complete search history.

(56) References Cited

U.S. PATENT DOCUMENTS

| 4,743,864 | A | * | 5/1988 | Nakagawa et al. | ......... 331/1 A |
| 4,955,038 | A | * | 9/1990 | Lee et al. | ................ 455/343.1 |
| 5,140,698 | A | * | 8/1992 | Toko | ...................... 455/343.4 |
| 5,402,446 | A | * | 3/1995 | Minami | ...................... 375/344 |
| 5,475,877 | A | * | 12/1995 | Adachi | ................... 455/343.2 |
| 6,434,376 | B1 | * | 8/2002 | Black | ...................... 455/343.3 |

FOREIGN PATENT DOCUMENTS

| JP | 8-251656 | 9/1996 |
| JP | 10-190568 | 7/1998 |
| JP | 2000-13269 | 1/2000 |
| JP | 2000-278752 | * 10/2000 |

* cited by examiner

*Primary Examiner*—Lana Le
(74) *Attorney, Agent, or Firm*—Oblon, Spivak, McClelland, Maier & Neustadt, P.C.

(57) ABSTRACT

A control unit measures a phase error between a reference timing of a mobile station and a reception timing from a base station based on reception data from a reception unit and a count from a reference timing counter unit, determines a frequency deviation correction value calculation period corresponding to the measured phase error, and outputs it to a frequency deviation correction value calculation unit. The frequency deviation correction value calculation unit does not calculate a deviation at every reception time when intermittent reception is repeated, but calculates a deviation at intervals following the frequency deviation correction value calculation period given from the control unit.

14 Claims, 14 Drawing Sheets

FIG.2

| PHASE ERROR λ BETWEEN REFERENCE TIMING OF MOBILE STATION AND RECEPTION TIMING FROM BASE STATION | FREQUENCY DEVIATION CORRECTION VALUE CALCULATION PERIOD |
|---|---|
| $a \leq \lambda$ | 64 FRAMES |
| $b \leq \lambda < a$ | 128 FRAMES |
| $c \leq \lambda < b$ | 256 FRAMES |
| $d \leq \lambda < c$ | 512 FRAMES |
| $e \leq \lambda < d$ | 1024 FRAMES |
| ... | ... |

TIMING CONTROL DEVICE AND TIMING CONTROL METHOD

TECHNICAL FIELD

The present invention relates to technology for maintaining synchronization between a mobile station and a base station when the mobile station is in a standby state.

BACKGROUND ART

Conventionally, the timing control devices in the mobile stations use a high-speed clock when maintaining synchronization with the base stations and when performing continuous reception. On the other hand, the timing control devices use a low-speed clock when they are in a standby state. As the low-speed clock requires less power than the high-speed clock, less power is consumed in the standby state. In order to make the transition into the intermittent reception smoothly, before the transition into the intermittent reception, frequency deviation between the high-speed clock and the low-speed clock is calculated in advance, and the low speed clock in which a frequency is corrected based on the calculated result is used at the sleep time in the intermittent reception time.

The high-speed clock is generally generated using the temperature compensated crystal oscillator (hereinafter, "TCXO"), moreover, the frequency (which is several ppm) of the high-speed clock is stable. On the contrary, the frequency (which is about 100 ppm) of the low-speed clock, like the Real Time Clock (hereinafter, "RTC") for operating a clock function, easily varies with the temperature. In other words, the low-speed clock is not very stable. Accordingly, when the intermittent reception is repeated for predetermined period, there is more probability of the low-speed clock being affected by the temperature. If the low-speed clock is affected, then the frequency of the clock differs from the frequency deviation calculated before the transition.

As is disclosed in Japanese Patent Application Laid-Open Publication No. 10-190568 (radio reception apparatus), for example, conventionally, the frequency deviation of the low-speed clock is periodically calculated by using the high-speed clock within the time where the intermittent reception continues. An outline of the conventional timing control devices in the mobile stations is explained below.

The frequency deviation occurs in Time Division Multiple Access (hereinafter, "TDMA") mobile communication system in which respective channels are separated by time axis, a Frequency Division Multiple Access (hereinafter, "FDMA") mobile communication system in which respective channels are separated by frequencies, and a Code Division Multiple Access (hereinafter, "CDMA") mobile communication system in which respective channels are divided by codes.

FIG. 12 is a block diagram of the conventional timing control device in the mobile station. This timing control device includes a TCXO 10, a phase synchronizer (hereinafter, "PLL") 20, a timing control unit 30, a low-speed clock generator (hereinafter, "RTC") 40, and a control unit 50. The timing control unit 30 includes dividers 31 and 32, a frequency deviation correction value calculation unit 33, and a reference timing counter unit 34.

The PLL 20 receives a TCXO clock 10t from the TXCO 10 and generates a reference clock 20t, which is multiplied by a frequency necessary for the timing control unit 30, and outputs the reference clock 20t to the divider 31 and the reference timing counter unit 34 in the timing control unit 30. The PLL 20 receives a PLL control signal 20r from the reference timing counter unit 34 and determines whether the reference clock 20t should be generated, and outputs a TCXO control signal 10r to the TXCO 10. When it is decided that the reference clock 20t is not necessary, the TCXO control signal 10r requests the TCXO. 10 to stop the oscillation. When it is decided that the reference clock 20t is necessary, the TCXO control signal 10r requests the TCXO 10 to oscillate.

The divider 31 divides the reference clock 20t so as to generate a high-speed clock 31t, and outputs it to the frequency deviation correction value calculation unit 33 and the divider 32. The frequency deviation correction value calculation unit 33 calculates a frequency deviation correction value 33t based on the high-speed clock 31t and a low-speed clock 40t which is generated from the RTC 40 steady so as to output it to the reference timing counter unit 34. The divider 32 divides the high-frequency clock 31t so as to generate a reference clock 32t and output it to the reference timing counter unit 34.

The control unit 50 outputs timing of transition from normal reception into sleep time in intermittent reception and end timing of the sleep time as clock switching timing 50t to the reference timing counter unit 34. The clock switching timing 50t which is output when the transition is made from the normal reception into the sleep time in the intermittent reception represents timing of switching from the reference clock 32t into the low-speed clock 40t. The clock switching timing 50t which is output when the sleep time in the intermittent reception is ended represents timing of switching from the low-speed clock 40t into the reference clock 32t.

The reference timing counter unit 34 generates reference timing 34t which gives operating references of respective parts in the mobile station based on the frequency deviation correction value 33t, the reference clock 32t, and the low-speed clock 40t, so as to supply it to the parts in the mobile station. The reference timing counter unit 34 determines whether the high-speed clock 31t is necessary based on the clock switching timing 50t, and generates the PLL control signal 20r. When the determination is made that the high-speed clock 31t is not necessary, the PLL control signal 20r requests the PLL 20 to stop oscillation, and when the determination is made that the high-speed clock 31t is necessary, the signal 20r requests the PLL 20 to oscillate.

The timing control device operates in the manner explained below. The reference timing counter unit 34 switches the clock from the reference clock 32t into the low-speed clock 40t and from the low-speed clock 40t into the reference clock 32t according to the clock switching timing 50t input from the control unit 50.

The switching from the low-speed clock 40t into the reference clock 32t is carried out due to the transition into the normal reception at the end of the sleep time in the intermittent reception. In this case, before the switching from the low-speed clock 40t into the reference clock 32t, the reference timing counter unit 34 outputs the PLL control signal 20r to the PLL 20, and requests the PLL 20 to start oscillation of the reference clock 20t. The PLL 20 receives the PLL control signal 20r and outputs the TCXO control signal 10r to the TCXO 10 so as to request the TCXO 10 to start oscillation of the TCXO clock 10t.

As a result, the TCXO clock 10t output from the TCXO 10 is multiplied by a clock required by the timing control unit 30 in the PLL 20 so as to become the reference clock 20t, and is input into the divider 31 and the reference timing counter unit 34 in the timing control unit 30. The divider 31 divides the input reference clock 20*t* into a clock frequency to be used by the frequency deviation correction value calculation unit 33, and outputs it as the high-speed clock 31*t* to the frequency deviation correction value calculation unit 33 and the divider 32. The divider 32 divides the input high-speed clock 31*t* into a clock with such a rate that it is used at the steady time such as continuous reception in reference timing counter unit 34, so as to output it as the reference clock 32*t* to the reference timing counter unit 34.

The reference timing counter unit 34 counts up a reference timing counter which gives operation reference timing of the mobile station according to the reference clock 32*t*, and generates a slot pulse, a frame pulse, or the like based on slot timing, frame timing, or the like so as to output the slot pulse or the frame pulse as the reference timing 34*t* to the parts in the mobile station. That is to say, the maintenance of synchronization with the base station is controlled by using the reference clock 32*t* generated from the high-frequency clock 31*t*, so that the normal continuous reception or the like is executed. The frequency deviation correction value calculation unit 33 calculates the frequency deviation of the low-speed clock 40*t* using the high-speed clock 31*t* during the normal reception, and outputs the obtained frequency deviation correction value 33*t* to the reference timing counter unit 34.

On the other hand, the reference timing counter unit 34 executes the switching from the reference clock 32*t* with high power consumption into the low-speed clock 40*t* with low power consumption in order to reduce the power consumption at the time of the transition from the normal reception into the sleep time in the intermittent reception. In this case, the reference timing counter unit 34 outputs the PLL control signal 20*r* to the PLL 20, and requests the PLL 20 to stop the oscillation of the reference clock 20*t*. The PLL 20 outputs the TCXO control signal 10*r* to the TCXO 10 according to the request, so as to request the TCXO 10 to stop the oscillation of the TCXO clock 10*t*.

The reference timing counter unit 34 corrects the low-speed clock 40*t* using the frequency deviation correction value 33*t*, and counts up the reference timing counter which gives the operation reference timing of the mobile station according to the corrected low-speed clock. As a result, the reference timing counter unit 34 supplies the reference timing 34*t* to the parts and manages end timing of the sleep time.

While the synchronization with the base station is being maintained by using the corrected low-speed clock, the intermittent reception operation is performed. Since the power consumption of the low-speed clock is small, the power consumption at the standby time is reduced. Before the intermittent reception operation is started, the control unit 50 starts the calculation of the sleep time, and outputs the clock switching timing 50*t* showing the end of the sleep time to the reference timing counter unit 34. This operation is repeated.

FIG. 13 is a flowchart of the intermittent reception operation in the conventional timing control device. At step ST101, the reference timing counter unit 34 counts up the reference timing counter using the clock which is obtained by correcting the low-speed clock 40*t* using the frequency deviation correction value 33*t*. When the count reaches the time of the switching from the low-speed clock 40*t* into the reference clock 32*t* represented by the clock switching timing 50*t* from the control unit 50, the sleep time is determined to be ended, and the PLL control signal 20*r* requests the PLL 20 to release the stop of oscillation.

At step ST102, when the PLL 20 receives the request of the oscillation starting from the PLL control signal 20*r*, the TCXO control signal 10*r* requests the TCXO 10 to release the stop of oscillation. The PLL 20 does not start the oscillation operation.

At step ST103, when the TCXO 10 receives the request of the oscillation starting from the TCXO control signal 10*r*, after the operation of the circuit becomes stable, the TCXO 10 starts output of the TCXO clock 10*t*. When the TCXO clock 10*t* is input into the PLL 20, the PLL 20 starts the oscillation operation for multiplying the TCXO clock 10*t*, and after the operation becomes stable, it outputs the multiplied reference clock 20*t*. When the reference clock 20*t* is output, the parts in the mobile station are ready for starting an operation. The high-frequency clock 31*t* is input into the frequency deviation correction value calculation unit 33 via the divider 31, and the calculation unit 33 starts to obtain the frequency deviation correction value 33*t*. When the reference clock 32*t* is input into the reference timing counter unit 34 via the dividers 31 and 32, the unit 34 switches the clock used for the counting-up of the reference timing counter from the low-speed clock 40*t* into the reference clock 32*t*.

At step ST104, the frequency deviation correction value calculation unit 33 generates a pulse width corresponding to 8192 clock of the low-speed clock 40*t* with 32.768 kilohertzs, and counts the pulse width using the high-speed clock 31*t* with 30.72 megahertzs. The calculation unit 33 obtains an average frequency deviation correction value 33*t* per one clock of the low-speed clock from a difference between the count and a counter number 7680000 at the time of no deviation, so as to output it to the reference timing counter unit 34.

At step ST105, the control unit 50 detects paging information of its own station from polling information from the base station. When its own station is not called, the control unit 50 instructs time that sleep time again comes and time that the sleep time is ended to the reference timing counter unit 34 using the clock switching timing 50*t*. When the counter value reaches the time of the switching from the reference clock 32*t* into the low-speed clock 40*t* shown by the clock switching timing 50*t*, the reference timing counter unit 34 switches the clock used for the counting-up operation from the reference clock 32*t* into the low-speed clock which is obtained by correcting the low-speed clock 40*t* using the frequency deviation correction value 33*t*. When the polling information from the base station includes the paging of its own station, the transition is made directly into the normal communication state without the transition into the sleep time.

At step ST106, the reference timing counter unit 34 requests the PLL 20 to stop oscillation using the PLL control signal 20*r*. At step ST107, when the PLL 20 receives the request of the oscillation stop from the PLL control signal 20*r*, after the PLL 20 stops the oscillation of the reference clock 20*t*, it requests the TCXO. 10 to stop oscillation using the TCXO control signal 10*r*. When the TCXO 10 receives the request of the oscillation stop from the TCXO control signal 10*r*, it stops output of the TCXO clock 10*t*. Thereafter, the control returns to step ST101. During the intermittent reception operation, the same operation is repeated.

A state at the time of the intermittent reception operation is shown in FIG. 14. FIG. 14 is a time chart of the intermittent reception operation. An intermittent reception period 131 includes reception time 132, sleep time 133, TCXO oscillation stable time 134, and PLL oscillation stable time 135. At the reception time 132, the polling information sent from the base station is received and a determination is made whether its destination is its own station using the reference clock 32t. When the received polling information does not include the paging of its own station, the clock is switched into the low-speed clock after the reception time 132 passes, and the sleep time 133 is started. The TCXO oscillation stable time 134 is until the TCXO 10 actuated at the end of the sleep time 133 can output the stable TCXO clock 10t. The PLL oscillation stable time 135 is until the PLL 20 actuated by the TCXO clock 10t can output the stable reference clock 20t.

At the reception standby time, the reference clock 32 is used only for the reception time 132 where the polling information is sent from the base station, and the low-speed clock 40t with the low power consumption is used for the following sleep time 133. As a result, the power consumption is reduced.

In the conventional timing control apparatus, the frequency deviation of the low-speed clock with low frequency stability is calculated in advance by using the high-speed clock with high frequency stability, and the deviation of the low-speed clock which is used at the sleep time in the intermittent reception time is corrected by a corrected value of the obtained frequency deviation. As a result, the timing management can be maintained accurately during the intermittent reception.

During the intermittent reception time, however, the frequency deviation of the low-speed clock with low frequency stability is required to be periodically calculated by the calculation of the corrected value using the high-speed clock with high frequency stability. As a result, the power consumption consumed by the calculation of the corrected value cannot be reduced.

It is an object of the present invention to at least solve the problems in the conventional technology.

DISCLOSURE OF THE INVENTION

A timing control device according to one aspect of the present invention is used in a mobile station and counts reference timing of the mobile station using an accurate high-speed clock at time of normal communication with a base station, and counts reference timing of the mobile station according to a low-speed clock corrected based on a deviation between the high-speed clock pre-calculated at the normal communication time and a low-speed clock with low accuracy at sleep time in intermittent reception time, so as to manage end timing of the sleep time in the intermittent reception time. The timing control device includes a fluctuation detector which obtains a phase error between a detecting position of an assumed reception channel and an actually detected position of a reception channel represented by the reference timing of the mobile station counted according to the high-speed clock at the reception time via the sleep time.

The timing control method according to another aspect of the present invention is employed in a mobile station and includes counting a reference timing of the mobile station using an accurate high-speed clock at time of normal communication with a base station, and counting the reference timing of the mobile station according to a low-speed clock corrected based on a deviation of the high-speed clock pre-calculated at the normal communication time and a low-speed clock with low accuracy at sleep time in intermittent reception time, to thereby manage end timing of the sleep time in the intermittent reception time; and obtaining a phase error between a detecting position of an assumed reception channel and a position of a reception channel actually detected representing by the reference timing of the mobile station counted according to the high-speed clock at reception time via the sleep time.

Other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 2 illustrates contains of a relationship table between a phase error $\lambda$ and a frequency deviation correction period calculation period in a control unit shown in FIG. 1;

A timing control device and a timing control method in a mobile station according to the exemplary embodiments of the present invention are explained below in detail with reference to the accompanying drawings.

Embodiment 1

Figure 1:
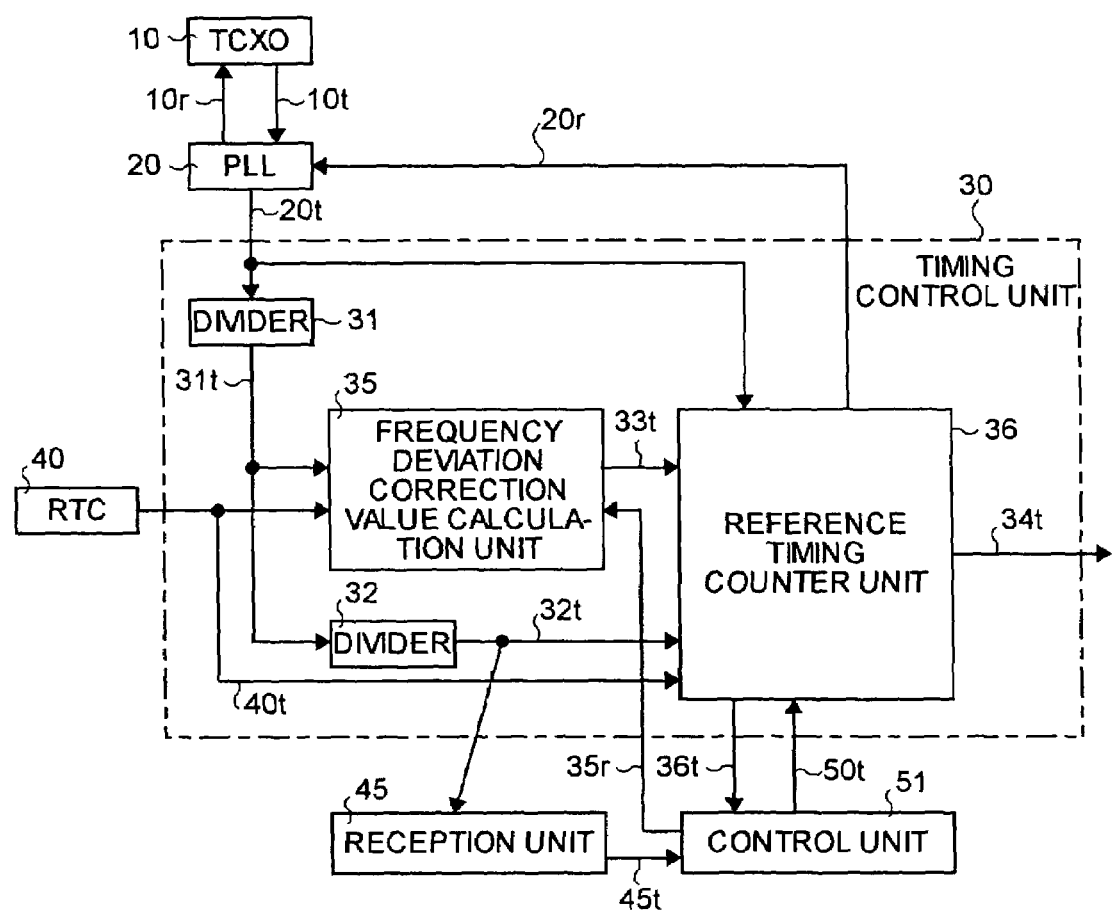
FIG. 1 is a block diagram of a timing control device in a mobile station according to a first embodiment of the present invention.
Figure 3:
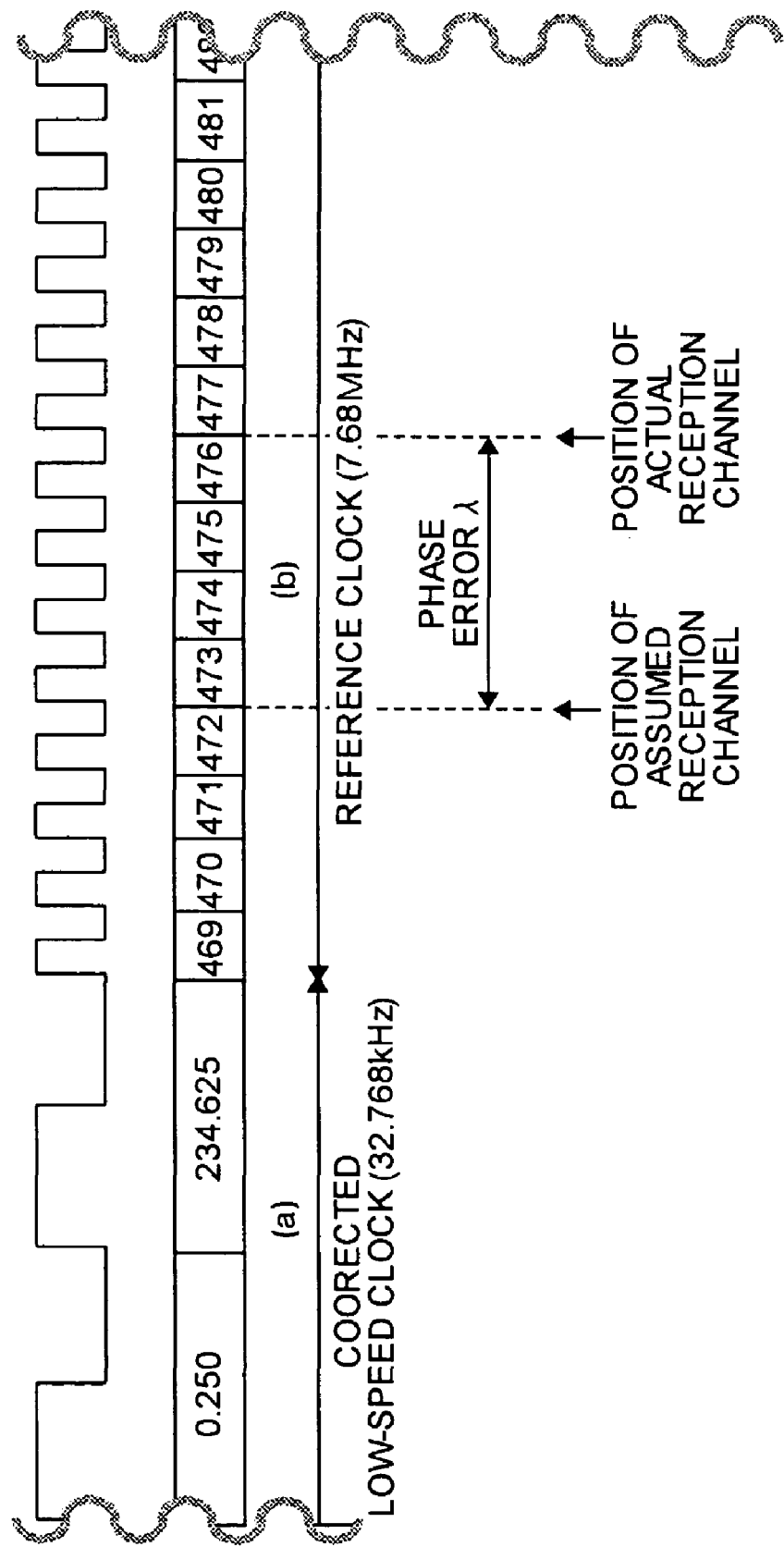
FIG. 3 is a time chart of a measurement operation of the phase error $\lambda$ between reference timing of the mobile station and reception timing from a base station which is performed by the control unit shown in FIG. 1.
Figure 4:
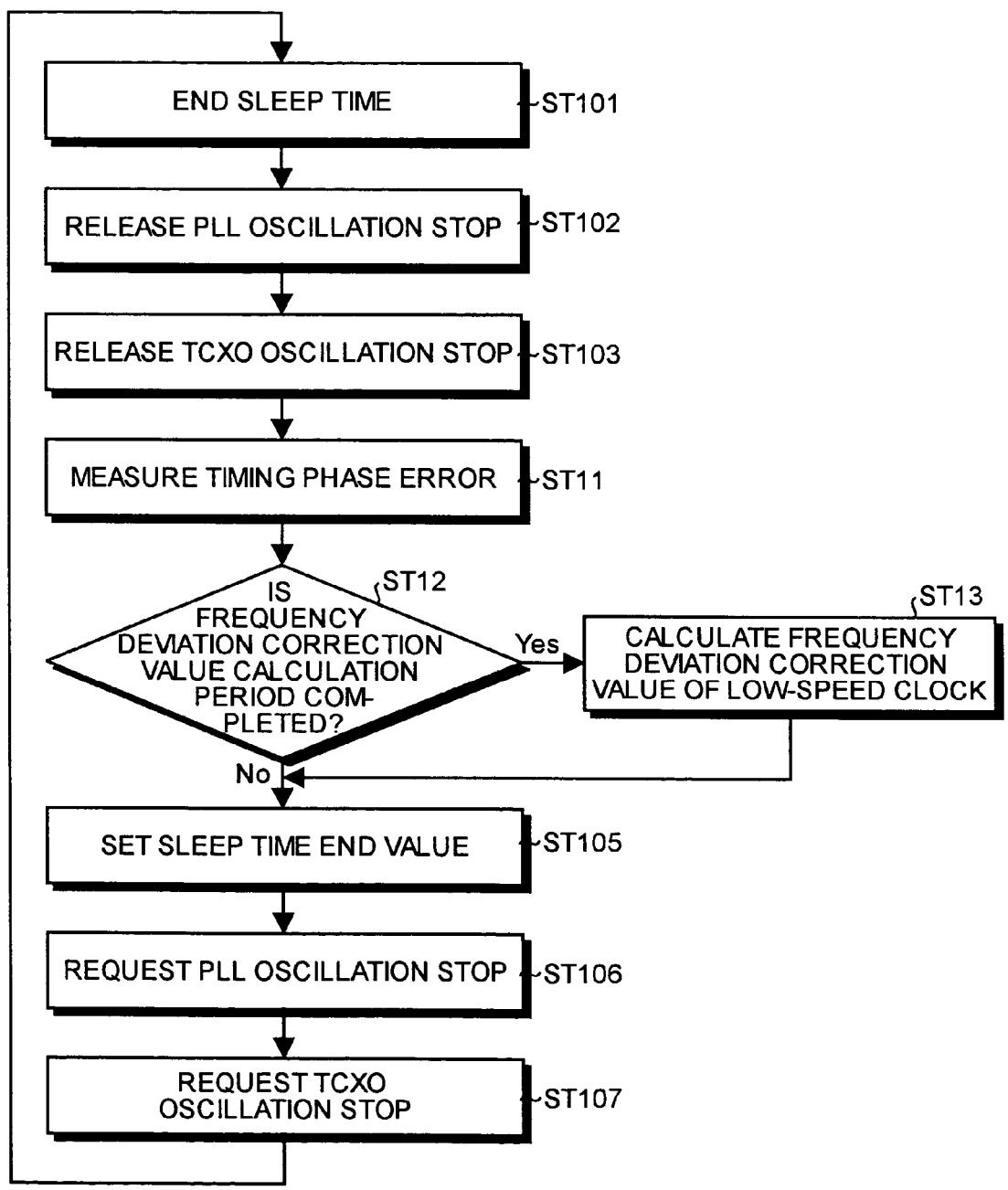
FIG. 4 is a flowchart of an operating procedure at intermittent reception time by the timing control device shown in FIG. 1.

FIG. 1 is a block diagram of the timing control device in the mobile station according to a first embodiment of the present invention. FIG. 2 illustrates contents of a relationship table between a phase error $\lambda$ and a frequency deviation correction period calculation period in a control unit shown in FIG. 1. FIG. 3 is a time chart of a measurement operation of the phase error $\lambda$ between reference timing of the mobile station and reception timing from a base station which is performed by the control unit shown in FIG. 1. FIG. 4 is a flowchart of an operating procedure at the intermittent reception time by the timing control device shown in FIG. 1.

Figure 12:
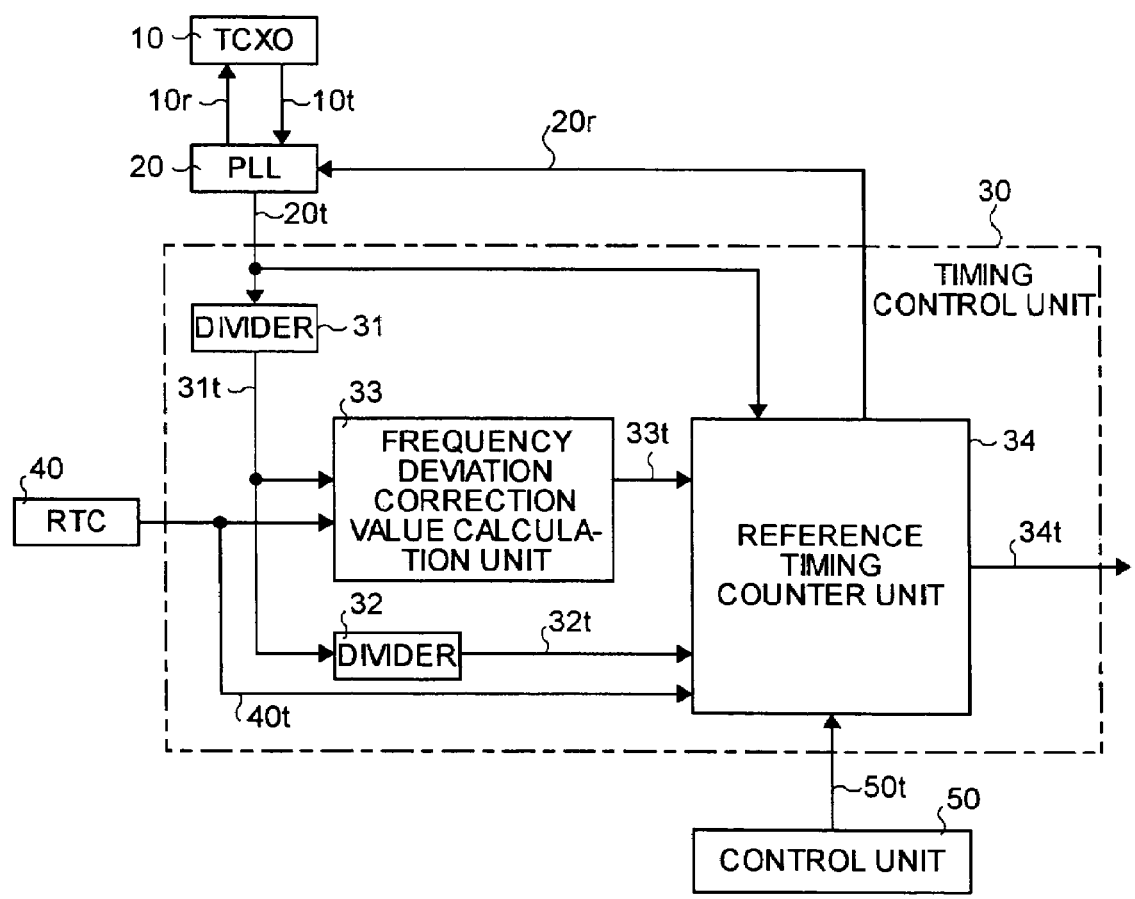
FIG. 12 is a block diagram of a structure of a timing control device in a conventional mobile station.

In FIG. 1, the portions which are the same as or correspond to those in the prior example shown in FIG. 12 are designated by the same reference numbers. The portions relating to the first embodiment are mainly explained. This is applied also to the following embodiments.

The timing control device according to the first embodiment includes a control unit 51 in place of the control unit 50 in FIG. 12, a frequency deviation correction value calculation unit 35 in place of the frequency deviation correction value calculation unit 33 in FIG. 12, and a reference timing counter unit 36 in place of the reference timing counter unit 34 in FIG. 12.

Figure 14:
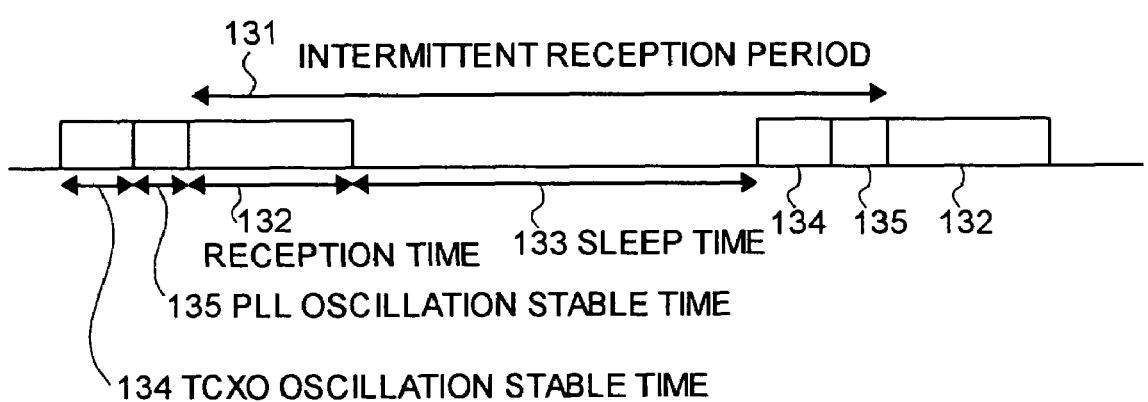
FIG. 14 is a time chart explaining contents of an intermittent reception period.

A reception unit 45 demodulates a reception signal from the base station received by an antenna, not shown, at reception time 132 (see FIG. 14) according to a reference clock 32t, and outputs obtained reception data 45t to the control unit 51. The reference timing counter unit 36 performs an operation for outputting a count 36t of a reference timing counter, which performs a counting operation according to the reference clock 32t and a low-speed clock 40t, to the control unit 51 in addition to the above-mentioned operation of the reference timing counter unit 34.

Besides the above-mentioned operation of the control unit 50 for outputting the clock switching timing 50t to the reference timing counter unit 36, the control unit 51 performs a following operation. The control unit 51 measures the phase error $\lambda$ between the reference timing of the mobile station and the reception timing from the base station based on the reception data 45t from the reception unit 45 and the count 36t from the reference timing counter unit 36. The control unit 51 obtains a frequency deviation correction value calculation period 33r corresponding to the measured phase error $\lambda$, and outputs the obtained frequency deviation correction value calculation period 35r to the frequency deviation correction value calculation unit 35. The measured phase error $\lambda$ is reflected by a degree of frequency fluctuation in the low-speed clock 40t due to temperature change or the like.

The frequency deviation correction value calculation unit 35 obtains a frequency deviation correction value 33t by the procedure similar to the frequency deviation correction value calculation unit 33. When an intermittent reception operation is repeated, however, the frequency deviation correction value calculation unit 35 does not obtain a deviation every reception time (see FIG. 14), but obtains a deviation at intervals following a frequency deviation correction value calculation period 35t given from the control unit 51.

The control unit 51 is provided with the relationship table between the phase error $\lambda$ and the frequency deviation correction value calculation period 35r as shown in FIG. 2, for example. As shown in FIG. 2, in the relationship table, the frequency deviation correction value calculation period 35r to be output is set according to a relationship between the phase error $\lambda$ and a predetermined threshold value. The control unit 51 refers to the relationship table so as to be capable of simply obtaining the frequency deviation correction value calculation period 35r corresponding to the measured phase error $\lambda$.

In FIG. 2, following is assumed. (1) When the measured phase error $\lambda$ is equal to or more than the threshold value "a" (a≦$\lambda$), the frequency deviation correction value calculation period 35r, which specifies that the frequency deviation correction value 33t is calculated in each 64 frames of an intermittent reception period, is output. (2) When the phase error $\lambda$ is equal to or more than the threshold value "b" and smaller than the threshold value "a" (b≦$\lambda$<a), the frequency deviation correction value calculation period 35r, which specifies that the frequency deviation correction value is calculated in each 128 frames which are two times as many as the 64 frames in the intermittent reception period, is output. (3) When the phase error $\lambda$ is equal to or more than the threshold value "c" and smaller than the threshold value "b" (c≦$\lambda$<b), the frequency deviation correction value calculation period 35r, which specifies that the frequency deviation correction value is calculated in each 256 frames which are four times as many as the 64 frames in the intermittent reception period, is output. (4) When the phase error $\lambda$ is equal to or more than the threshold value "d" and smaller than the threshold value "c" (d≦$\lambda$<c), the frequency deviation correction value calculation period 35r, which specifies that the frequency deviation correction value is calculated in each 512 frames which are eight times as many as the 64 frames in the intermittent reception period; is output. (5) When the phase error $\lambda$ is equal to or more than the threshold value "e" and smaller than the threshold value "d" (e≦$\lambda$<d), the frequency deviation correction value calculation period 35r, which specifies that the frequency deviation correction value is calculated in each 1824 frames which are sixteen times as many as the 64 frames in the intermittent reception period, is output.

In other words, when the measured phase error $\lambda$ is larger than the threshold value "a", the frequency deviation correction value 33t is always calculated in each 64 frames in the intermittent reception period, for example. On the other hand, when the phase error $\lambda$ is smaller than the threshold value "a", the frequency deviation correction value 33t is calculated at various intervals larger than the 64 frames. When the measured phase error $\lambda$ is larger than the threshold value "a", the frequency deviation correction value 33t is always calculated in each 64 frames in the intermittent reception period, but the frequency deviation correction value 33t may be calculated at each intermitted reception period which is the shortest period, for example.

An operation of the timing control device having the above structure is explained below with reference to FIGS. 1 to 4. Concrete numerical examples of the clocks are explained. A TCXO clock 10t output from a TCXO 10 is 16.00 megahertzs. A reference clock 20t output from a PLL 20 is (clock required by a timing control unit 30) is 61.44 megahertzs. A high-speed clock 31t output from a divider 31 is 30.72 megahertzs. A reference clock 32t output from a divider 32 is 7.68 megahertzs. A low-speed clock 40t output from a RTC 40 is 32.768 kilohertzs.

The reference timing counter unit 36, therefore, switches the clock from the reference clock 32t of 7.68 megahertzs into the low-speed clock 40t of 32.768 kilohertzs, and from the low-speed clock 40t of 32.768 kilohertzs into the reference clock 32t of 7.68 megahertzs according to the clock switching timing 50t from the control unit 51.

The frequency deviation correction value calculation unit 35 obtains a deviation between the high-speed clock 31t of 30.72 megahertzs and the low-speed clock 40t of 32.768 kilohertzs, and outputs the frequency deviation correction value 33t to the reference timing counter unit 36. At this time, the frequency deviation correction value calculation unit 35 does not obtain a deviation at every reception time but obtains a deviation at intervals following the frequency deviation correction value calculation period 35*t* given from the control unit 51 when the intermittent reception operation is repeated.

That is to say, at the reception time in the intermittent reception time, in the first embodiment, a following operation is performed. In FIG. 3, the reference timing counter unit 36 counts up the reference timing counter which gives the reference timing of the mobile station using the corrected low-speed clock of 32.768 kilohertzs to which the frequency deviation correction value 33*t* is added at sleep time (a) in the intermittent reception time, so as to manage end time of the sleep time.

When the sleep time (a) is over, the reference timing counter unit 36 begins counting up the reference timing counter using the reference clock of 7.68 megahertzs until the end of reception time (b). The numbers "469", "470" to "479" represent this count. The counts "0.250" and "234.625" at the end of the sleep time (a) represent that while the low-speed clock of 32.768 kilohertzs is oscillated for one clock, the reference clock of 7.68 megahertzs is oscillated for 234.375 clocks.

The reference timing counter unit 36 switches the clock from the low-speed clock 40*t* of 32.768 kilohertzs into the reference clock 32*t* of 7.68 megahertzs according to the clock switching timing 50*t*, and outputs the count 36*t* at the reception time (b) to the control unit 51. The control unit 51 receives the count 36*t* from the reference timing counter unit 36 at the reception time, and timing of the count "473" is supposed to be a reception channel position.

At the time of transition into the reception time, the reception unit 45 starts a modulating operation or the like of the reception signal from the base station received via the antenna according to the reference clock 32*t*, and outputs reception data 45*t* obtained by modulating the reception signal to the control unit 51.

When the control unit 51 receives the reception data 45*t* from the reception unit 45, it determines which timing in the counts 36*t* received from the reference counter unit 36 is a head position of the reception channel including polling information or the like transmitted from the base station. The head position of the reception channel is determined as the count "477". Since the timing of the count "473" is supposed to be the head position of the reception channel, the control unit 51 recognizes that the phase error λ between the reference timing of the mobile station and the reception timing from the base station is "4".

The reference timing counter is counted up by the corrected low-speed clock of 32.768 kilohertzs at the sleep time (a). Meanwhile, the reception unit 45 performs the reception operation according to the reference clock 32*t* of 7.68 megahertzs. The frequency deviation of the low-speed clock 40*t* occasionally fluctuates due to temperature change or the like more than the previously calculated frequency deviation correction value 33*t*. In this case, the switching timing from the sleep time (a) into the reception time (b) shifts from timing at which the reference clock 32*t* of 7.68 megahertzs is stably generated in response to starting of the reception time (b). The phase error λ represents a degree of the shift.

When the phase error λ can be measured in such a manner, the control unit 51 refers to the relationship table shown in FIG. 2 and obtains the corresponding frequency deviation correction value calculation period 35*r* so as to output it to the frequency deviation correction value calculation unit 35.

The frequency deviation correction value calculation unit 35 calculates a frequency deviation of the low-speed clock 40*t* of 32.768 kilohertzs using the high-speed clock 31*t* of 30.72 megahertzs at the reception time (the reception time at the steady continuous reception time and intermittent reception time), and outputs the frequency deviation correction value 33*t* which is obtained based on the frequency deviation to the reference timing counter unit 36. The phase error λ is measured at the reception time in the first intermittent reception time (namely, the reception time via first sleep time).

When the intermittent reception operation is repeated, the frequency deviation correction value calculation unit 35 calculates the frequency deviation correction value at second and after reception time with a period according to the frequency deviation correction value calculation period 35*r*.

In the example of FIG. 2, when, for example, the measured phase error λ is equal to or more than the preset threshold value "a", the frequency deviation correction value is calculated in each 64 frames of the intermittent reception period. When the phase error λ is equal to or more than the threshold value "b" and smaller than the threshold value "a", the calculation is made in each 128 frames which are two times as many as the 64 frames in the intermittent reception period. When the phase error λ is equal to ore more than the threshold value "c" and smaller than the threshold value "b", the calculation is made in each 256 frames which are four times as many as the 64 frames in the intermittent reception period.

The reference timing counter unit 36 corrects the low-speed clock 40*t* of 32.768 kilohertzs using the frequency deviation correction value 33*t* at the sleep time of the intermittent reception, and counts up the reference timing counter so as to count the reference timing of the mobile station. However, since the frequency deviation correction value 33*t* is input with the period according to the frequency deviation correction value calculation period 35*r*, the low-speed clock 40*t* is corrected with the period according to the frequency deviation correction value calculation period 35*r*.

Figure 13:
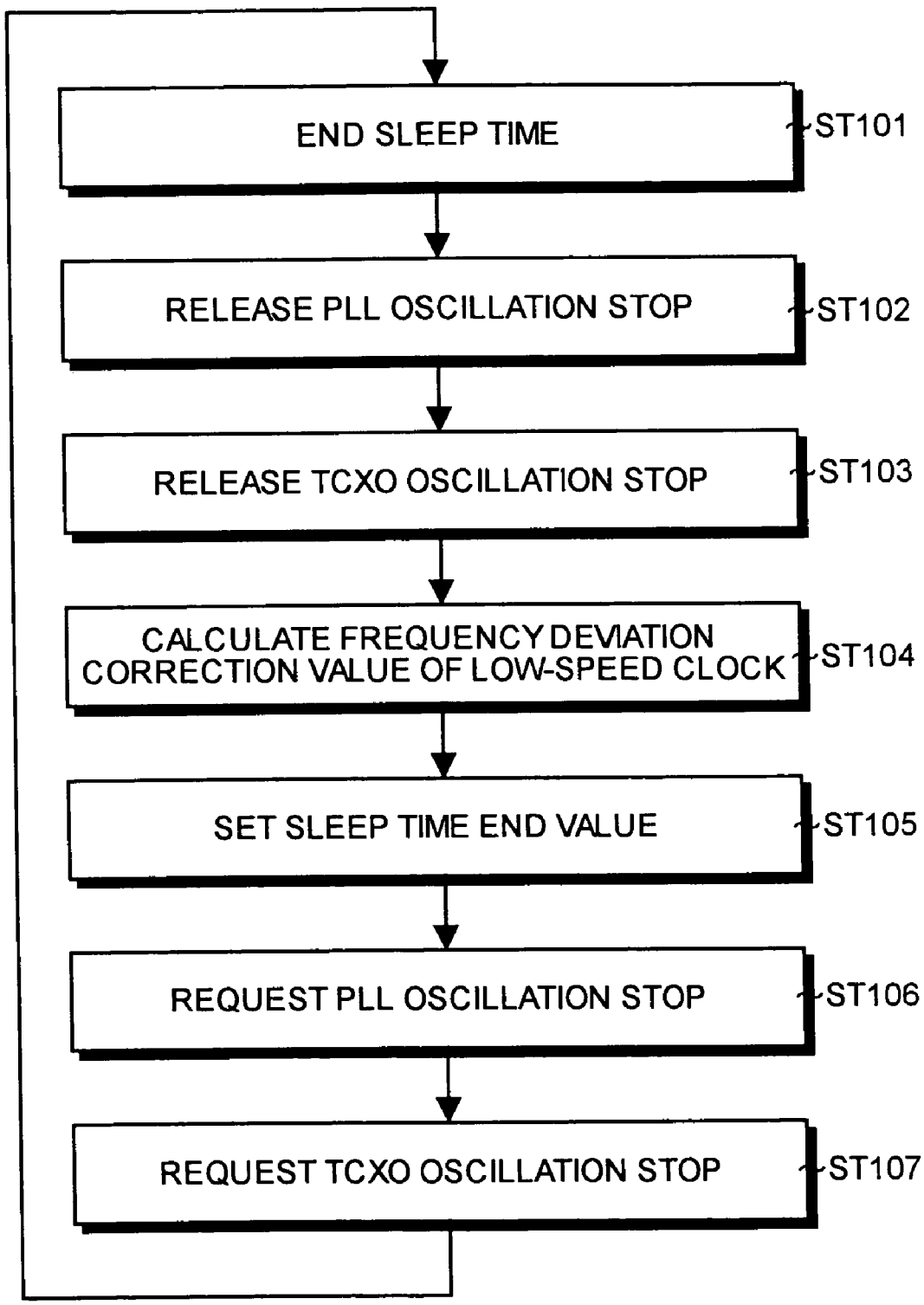
FIG. 13 is a flowchart of the operating procedure at the intermittent reception time by the timing control device shown in FIG. 12.

The procedure of the intermittent reception operation controlled by the timing control device is now explained with reference to FIG. 4. In FIG. 4, the steps which perform same procedure as those in FIG. 13 are designated by the same reference numbers. As shown in FIG. 4, in the first embodiment, instead of step ST104 shown in. FIG. 13, steps ST11 to ST13 are added. The parts relating to the first embodiment are mainly explained here.

At step ST11 in FIG. 4, the control unit 51 measures the phase error λ between the reference timing of the mobile station and the reception timing from the base station according to a difference between the position of the reception channel including the polling information and the like actually transmitted from the base station and the position of the pre-assumed reception channel. The control unit 51 refers to the relationship table (FIG. 2) as to the measured phase error λ so as to obtain the frequency deviation correction value calculation period 35*r*, and outputs it to the frequency deviation correction value calculation unit 35.

At step ST12, the frequency deviation correction value calculation unit 35 determines whether the frequency deviation correction value calculation period 35*r* input from the control unit 51 is reached. If reached, the control is given to step ST13.

At step ST13, the frequency deviation correction value calculation unit 35 generates a pulse width corresponding to an 8192 clock of the low-speed clock 40*t* with 32.768 kilohertzs, and counts the pulse width using the high-speed clock 31*t* of 30.72 megahertzs. The calculation unit 35 obtains an average frequency deviation correction value 33*t* per one clock of the low-speed clock from a difference between the count and a count number 7680000 in the case of no deviation, so as to output it to the reference timing counter unit 36. Thereafter, the control is given to step ST105.

On the other hand, at step ST12, when the frequency deviation correction value calculation period 35r input from the control unit 51 is not reached, the control is given to step ST105 so that the frequency deviation correction value calculation unit 35 does not calculate the correction value. Within the time at which the intermittent reception operation is repeated, the steps ST105 to ST107 are repeated.

The timing control device according to the first embodiment calculates the deviation between the accurate high-speed clock which is used by the mobile station at the reception time or the like at which the polling information is transmitted from the base station to its own station or the like at the intermittent reception time and the low-speed clock with low accuracy which is used by the mobile station at the sleep time in the intermittent reception time with the period according to fluctuation in the frequency stability of the low-speed clock. For this reason, when the fluctuation in the frequency stability is large due to the temperature change or the like, the calculation is frequently made at every intermittent reception period, for example. When the fluctuation in the frequency stability is small, the calculation period can be longer than the intermittent reception period. When the fluctuation in the frequency stability is small, the calculating frequency of the frequency deviation of the low-speed clock can be reduced, so that the power consumption consumed by the calculation of the correction value can be reduced.

Figure 5:
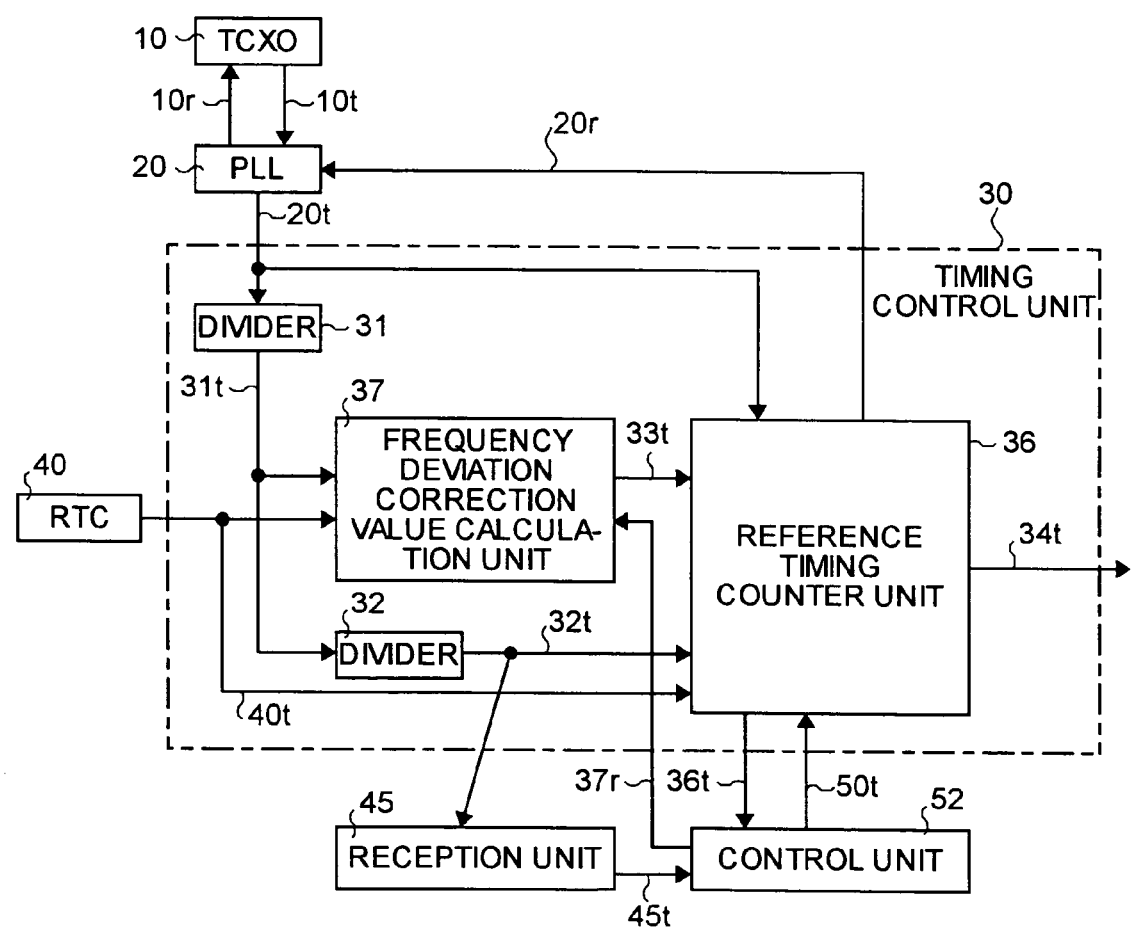
FIG. 5 is a block diagram of the timing control device in the mobile station according to a second embodiment of the present invention.
Figure 6:
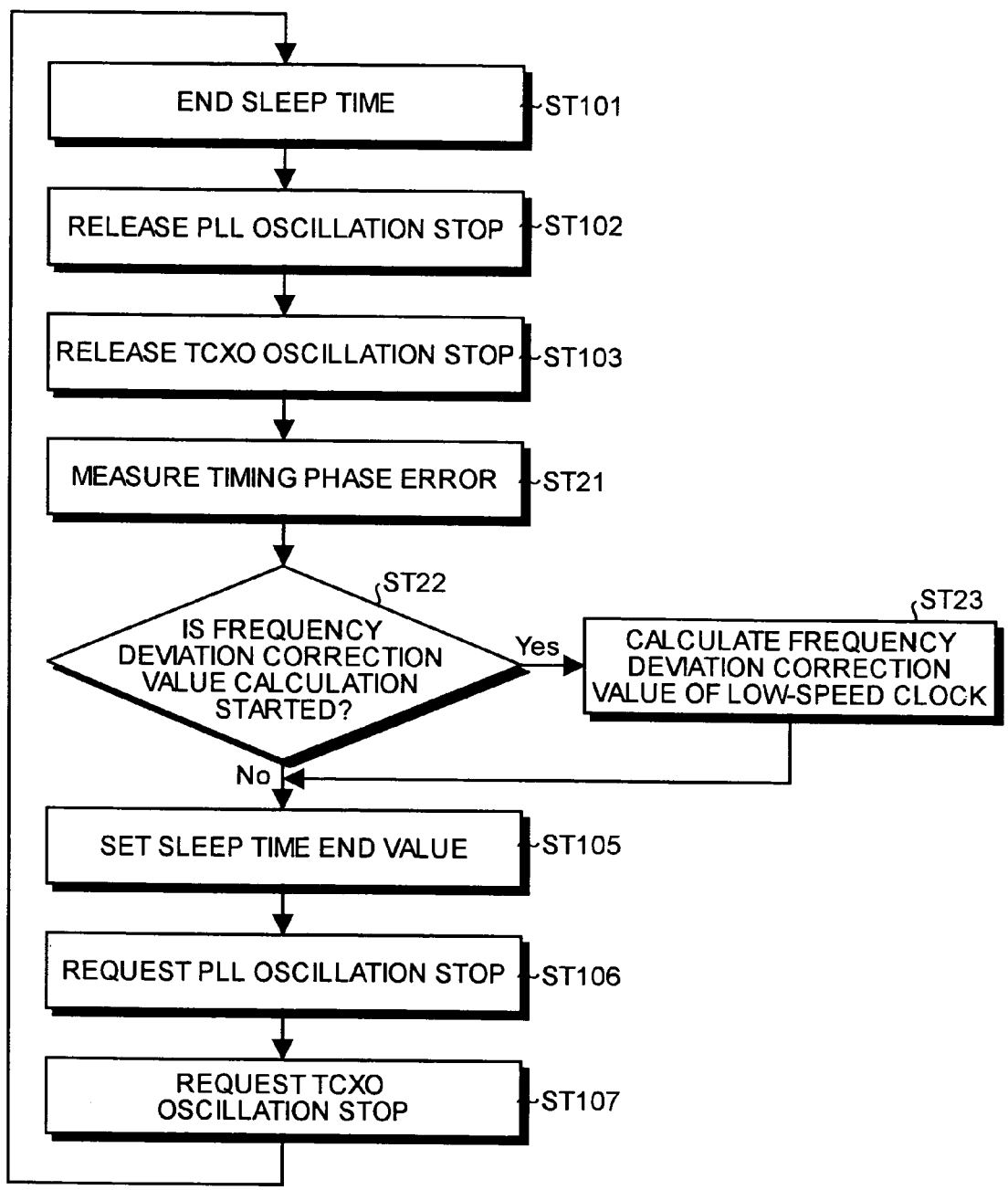
FIG. 6 is a flowchart of the operating procedure at the intermittent reception time by the timing control device shown in FIG. 4.

FIG. 5 is a block diagram of the timing control device in the mobile station according to a second embodiment of the present invention. FIG. 6 is a flowchart explaining the operating procedure at the intermittent reception time by the timing control device shown in FIG. 5.

As shown in FIG. 5, in the second embodiment, the structure shown in FIG. 1 has a control unit 52 which replaces the control unit 51, and a frequency deviation correction value calculation unit 37 which replaces the frequency deviation correction value calculation unit 35. The other parts are similar to those in the structure of FIG. 1.

Similarly to the control unit 51 shown in FIG. 1, the control unit 52 measures the phase error λ between the reference timing of the mobile station and the reception timing from the base station based on the reception data 45t from the reception unit 45 and the count 36t from the reference timing counter unit 36. In the second embodiment, when the measured phase error λ exceeds a preset threshold value, the control unit 52 outputs a frequency deviation correction value calculating start signal 37r to the frequency deviation correction value calculation unit 37.

The frequency deviation correction value calculation unit 37 obtains the frequency deviation correction value 33t in the same procedure as that of the frequency deviation correction value calculation unit 33, but the calculation of the correction value is started according to the frequency deviation correction value calculating start signal 37r from the control unit 52.

As to the measurement of the phase error λ, the measurement at the reception time at the first intermittent reception time is assumed (namely, the reception time via the first sleep time) is assumed similarly to the first embodiment.

The procedure of the intermittent reception operation controlled by the timing control device is explained, below with reference to FIG. 6. In FIG. 6, the steps that perform the same process as in FIG. 13 are designated by the same reference numbers. As sown in FIG. 6, in the second embodiment, instead of step ST104 shown in FIG. 13, the steps ST21 to ST23 are added. The steps relating to the second embodiment is mainly explained here.

At step ST21, the control unit 52 measures the phase error λ between the reference timing of the mobile station and the reception timing from the base station using the difference between the position of the reception channel including the polling information or the like actually transmitted from the base station and the position of the assumed reception channel. The control unit 52 determines whether the measured phase error λ exceeds a preset threshold value m. When the measured phase error λ exceeds the threshold value m, the control unit 52 instructs the frequency deviation correction value calculating start signal 37r representing that the frequency deviation correction value is calculated to the frequency deviation correction value calculation unit 37.

At step ST22, the frequency deviation correction value calculation unit 37 determines whether the frequency deviation correction value calculating start signal 37r is input from the control unit 52, namely, whether the frequency deviation correction value is calculated. When calculating, the control is given to step ST23.

At step ST23, the frequency deviation correction value calculation unit 37 generates a pulse width corresponding to a 8192 clock of the low-speed clock 40t with 32.768 kilohertzs, and counts the pulse width using the high-speed clock 31t of 30.72 megahertzs. The calculation unit 37 obtains the average frequency deviation correction value 33t per one clock of the low-speed clock according to a difference between the count and the count number 7680000 in the case of no deviation so as to output it to the reference timing counter unit 36. Thereafter, the control is given to ST105.

On the other hand, at step ST22, when the frequency deviation correction value calculating start signal 37r is not input from the control unit 52, the frequency deviation correction value calculation unit 37 does not calculate the correction value and the control is given to step ST105. For the time at which the intermittent reception operation is repeated, the steps ST101 to ST107 are repeated.

The timing control device of the second embodiment calculates the deviation between the accurate high-speed clock which is used by the mobile station at the reception time at which the polling information is transmitted from the base station to its own station at the intermittent reception time and the low-speed clock with low accuracy which is used by the mobile station at the sleep time in the intermittent reception time according to the fluctuation in the frequency stability of the low-speed clock. For this reason, only when the fluctuation in the frequency stability is large, the calculation can be made. When the fluctuation in the frequency stability due to the temperature change or the like is small, the calculation of the frequency deviation of the low-speed clock can be set so as not to be executed. As a result, the power consumption consumed by the calculation of the correction value can be reduced.

Figure 7:
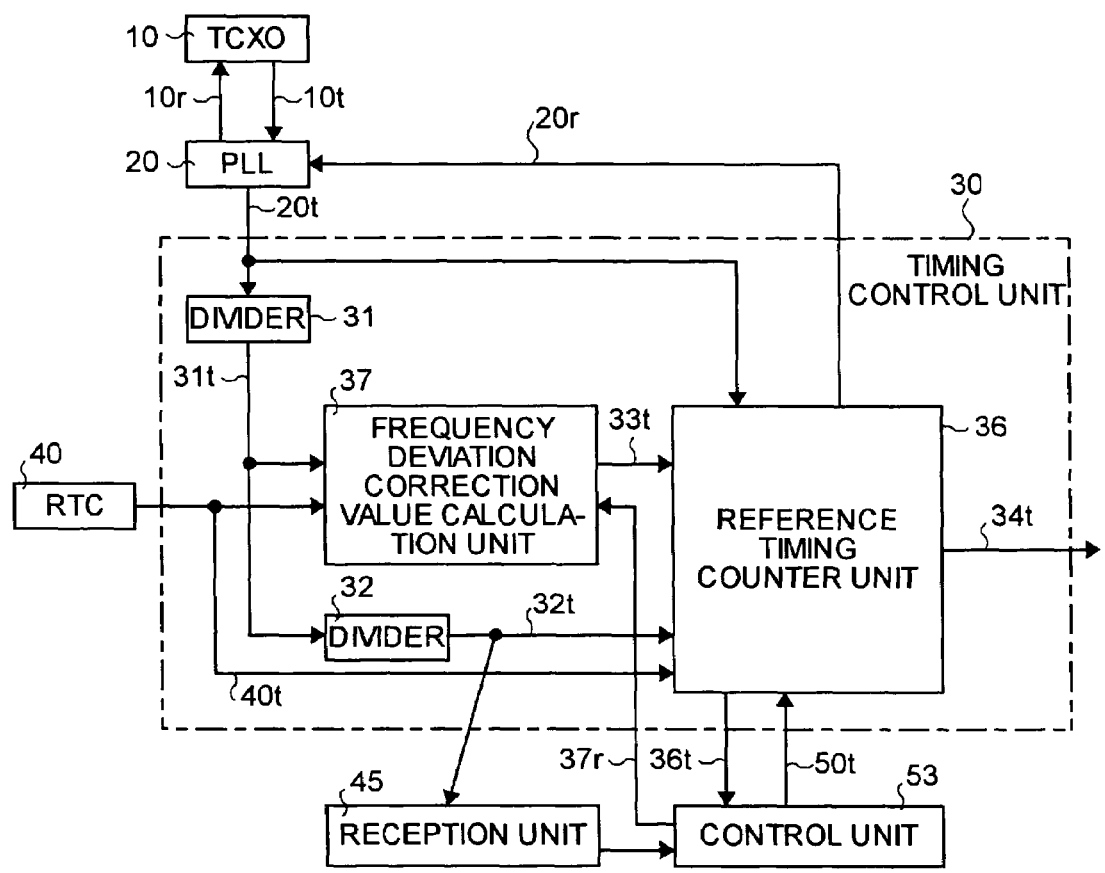
FIG. 7 is a block diagram of the timing control device in the mobile station according to a third embodiment of the present invention.
Figure 8:
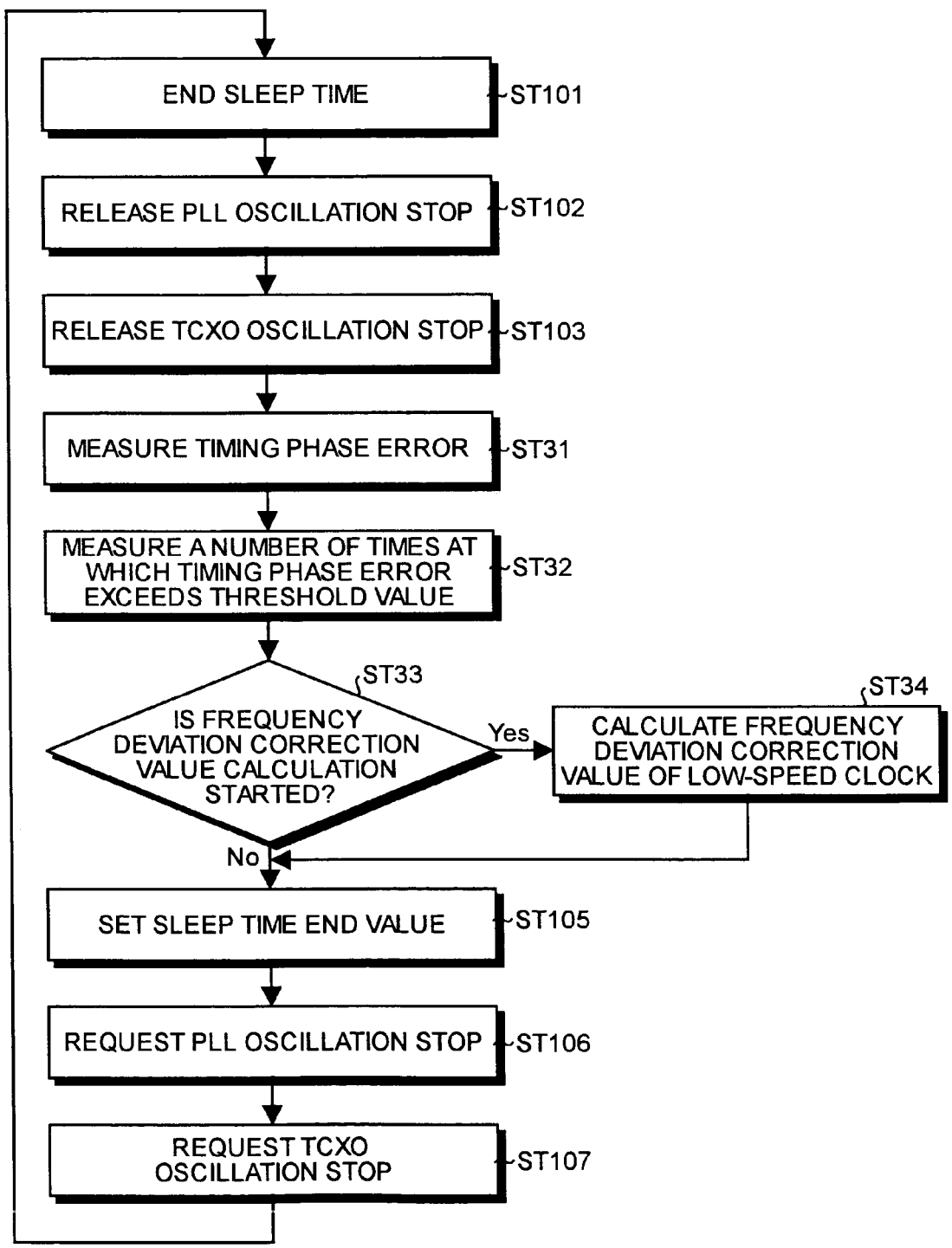
FIG. 8 is a flowchart of the operating procedure at the intermittent reception time by the timing control device shown in FIG. 7.

FIG. 7 is a block diagram of the timing control device in the mobile station according to the third embodiment of the present invention. FIG. 8 is a flowchart explaining the operation procedure at the intermittent reception time by the timing control device shown in FIG. 7.

As shown in FIG. 7, in the third embodiment, a control unit 53 which replaces the control unit 52 is provided to the structure shown in FIG. 5. The other parts are similar to those in the structure shown in FIG. 5.

Similarly to the control unit 52 shown in FIG. 5, the control unit 53 measures the phase error λ between the reference timing of the mobile station and the reception timing from the base station based on the reception data 45t from the reception unit 45 and the count 36t from the reference timing counter unit 36. The control unit 53 determines whether the measured phase error λ exceeds a preset threshold value.

In the third embodiment, when the measured phase error λ is larger than the preset threshold value, the control unit 53 stores that the phase error λ exceeds the threshold value. When the measured phase error λ continuously exceeds the preset threshold values at the same number of times as the number of the preset threshold values, the control unit 53 outputs the frequency deviation correction value calculating start signal 37r to the frequency deviation correction value calculation unit 37, so as to instructs that the frequency deviation correction value is calculated.

As to the measurement of the phase error λ, similarly to the first and second embodiments, the measurement at the reception time in the first intermittent reception time (namely, the reception time via the first sleep time) is assumed.

The procedure of the intermittent reception operation controlled by the timing control device will be explained with reference to FIG. 8. In FIG. 8, the steps that perform the same process as in FIG. 13 are designated by the same reference numbers. As shown in FIG. 8, in the third embodiment, instead of step ST104 shown in FIG. 13, the steps ST31 to ST34 are added. The parts relating to the third embodiment are mainly explained here.

At step ST31, the control unit 53 measures the phase error λ between the reference riming of the mobile station and the reception timing from the base station depending on the difference between the position of the reception channel including the polling information or the like actually transmitted from the base station and the position of the assumed reception channel. The control unit 53 determines whether the measured phase error λ exceeds the preset threshold value m. When the phase error λ is larger than the preset threshold value m, the control unit 53 stores that the phase error λ exceeds the threshold value.

At step ST32, the control unit 53 determines whether the phase error λ continuously exceeds the threshold value m at "n" times which is the same as the number of the preset threshold values. When the phase error λ continuously exceeds the threshold value at the "n" times, the control unit 53 outputs the frequency deviation correction value calculating start signal 37r to the frequency deviation correction value calculation unit 37 so as to instruct that the frequency deviation correction value is calculated.

At step ST33, the frequency deviation correction value calculation unit 37 determines whether the frequency deviation correction value calculating start signal 37r is input from the control unit 53, namely, whether the frequency deviation correction value is calculated. When calculating, the control is given to step ST34.

At step ST34, the frequency deviation correction value calculation unit 37 generates a pulse width corresponding to the 8192 clock of the low-speed clock 40t with 32.768 kilohertzs, and counts the pulse width using the high-speed clock 31t with 30.72 megahertzs. The calculation unit 37 obtains the average frequency deviation correction value 33t per one clock of the low-speed clock depending on the difference between the count and the count number 7680000 in the case of no deviation, so as to output it to the reference timing counter unit 36. Thereafter, the control is given to step ST105.

On the other hand, at step ST33, when the frequency deviation correction value calculating start signal 37r is not input from the control unit 53, the frequency deviation correction value calculation unit 37 does not calculate the correction value and the control is given to step ST105. At the time at which the intermittent reception operation is repeated, the steps ST101 to ST107 are repeated.

The timing control device of the third embodiment calculates the deviation between the accurate high-speed clock which is used by the mobile station at the reception time or the like at which the polling information is transmitted from the base station to its own station or the like for the intermittent reception time and the low-speed clock with low accuracy which is used by the mobile station at the sleep time in the intermittent reception time according to the fluctuation in the frequency stability of the low-speed clock. For this reason, only when the large fluctuation in the frequency stability continues, the calculation can be made. When the fluctuation in the frequency stability due to the temperature change or the like is small, therefore, the calculation of the frequency deviation of the low-speed clock can be set not to be executed. As a result, the power consumption consumed by the calculation of the correction value can be reduced.

Figure 9:
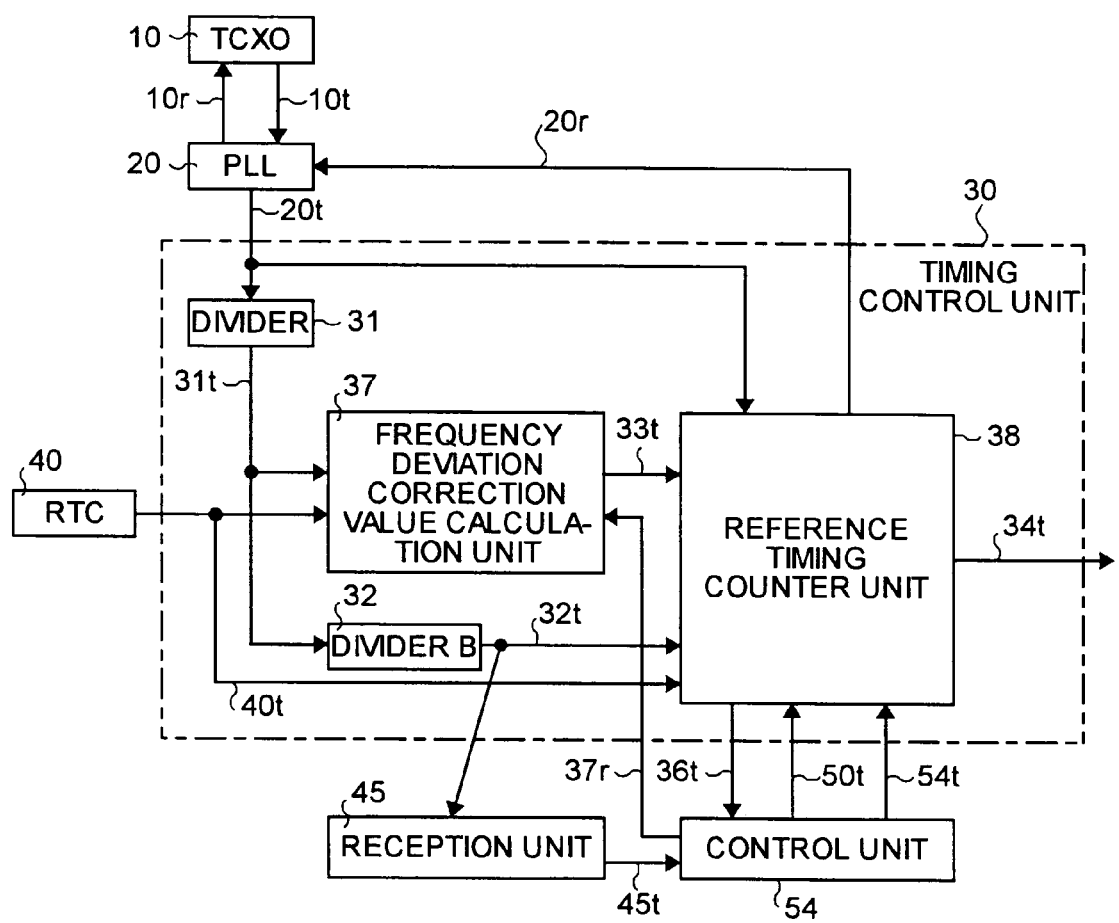
FIG. 9 is a block diagram of the timing control device in the mobile station according to the fourth embodiment of the present invention.
Figure 10:
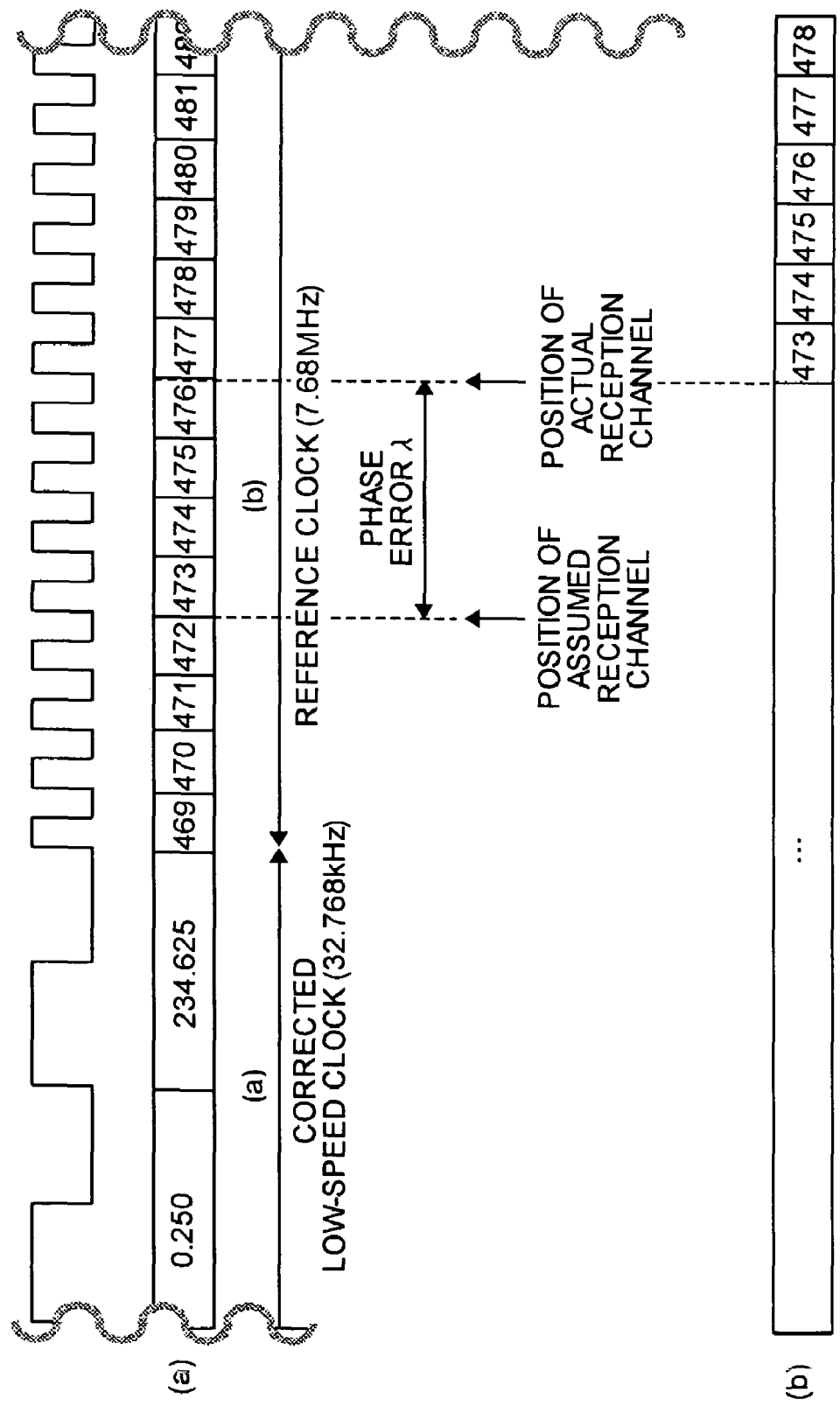
FIG. 10 illustrates time charts explaining the measurement operation of the phase error $\lambda$ between the reference timing of the mobile station and the reception timing from the base station which is performed by the control unit shown in FIG. 9 and a correction operation of a reference timing counter.
Figure 11:
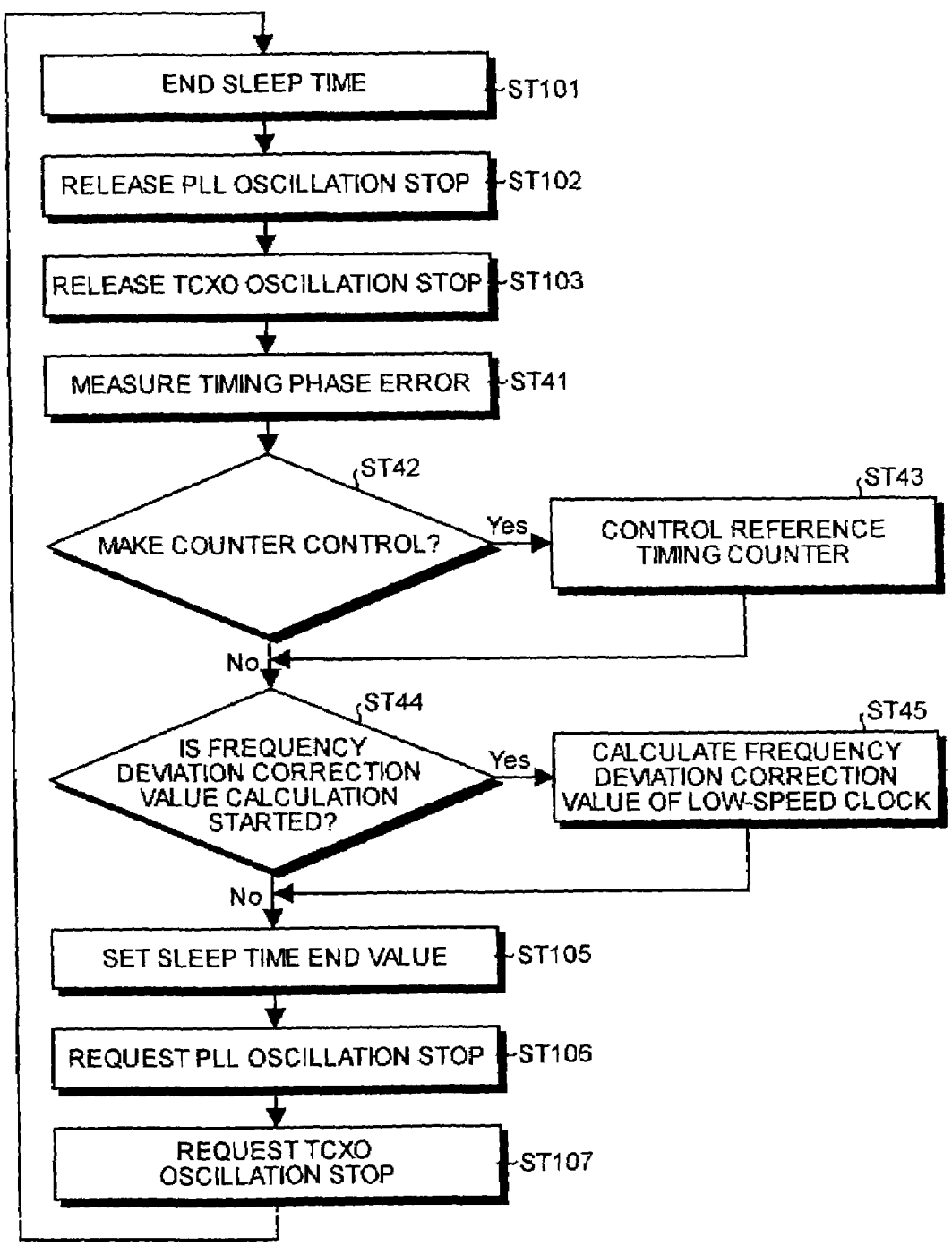
FIG. 11 is a flowchart of an operating procedure at the intermittent reception time by the timing control device shown in FIG. 9.

FIG. 9 is a block diagram of the timing control device in the mobile station according to the fourth embodiment of the present invention. FIG. 10 illustrates time charts explaining the measuring operation of the phase error λ between the reference timing of the mobile station and the reception timing from the base station which is performed by the control unit shown in FIG. 9, and the correcting operation of the reference timing counter. FIG. 11 is a flowchart explaining the operating procedure at the intermittent reception time by the timing control device shown in FIG. 9.

As shown in FIG. 9, in the fourth embodiment, the structure shown in FIG. 5, for example, has a control unit 54 which replaces the control unit 52, and a reference timing counter unit 38 which replaces the reference timing counter unit 36.

Similarly to the control unit 52 shown in FIG. 5, the control unit 54 measures the phase error λ between the reference timing of the mobile station and the reception timing from the base station based on the reception data 45t from the reception unit 45 and the count 36t from the reference timing counter unit 38. When the measured phase error λ exceeds the preset threshold value, the control unit 54 outputs the frequency deviation correction value calculating start signal 37r to the frequency deviation correction value calculation unit 37. In the fourth embodiment, the control unit 54 outputs a count control signal 54t generated based on the measured phase error λ to the reference timing counter unit 38.

Similarly to the reference timing counter unit 36 shown in FIG. 5, the reference timing counter unit 38 counts up the reference timing counter according to the reception of the clock switching timing 50t from the control unit 54 using the reference clock 32t and the low-speed clock, and outputs the count 36t to the control unit 54. In the fourth embodiment, the reference timing counter unit 38 further performs the correcting operation for advancing or delaying the count of the reference timing counter which is counted up by the reference clock 32t according to the reception of the count control signal 54t from the control unit 54.

The operation of the control unit relating to the fourth embodiment 4 is explained below with reference to FIG. 10. In FIG. 10, (a) illustrates a method of measuring the phase error λ explained in FIG. 3. In the fourth embodiment, since the measured phase error λ is "4", the control unit 54 determines that the count of the reference timing counter in the reference timing counter unit 38 advances by "4", and generates the count control signal 54*t* for "subtracting 4" from the count so as to output it to the reference timing counter unit 38.

As a result, as shown in (b) of FIG. 10, the reference timing counter in the reference timing counter unit 38 at the reception time (b) is corrected so that the counter value is delayed by 4 from "477" to "473". The count operation using the reference clock 32*t* is started from the corrected count "473" so as to be continued.

The procedure of the intermittent reception operation controlled by the timing control device is explained below with reference to FIG. 11. In FIG. 11, the steps that perform the same process as those in FIG. 13 are designated by the same reference numbers. As shown in FIG. 11, in the fourth embodiment, instead of step ST104 shown in FIG. 13, the steps ST41 to ST45 are added. The parts relating to the fourth embodiment are mainly explained.

At step ST41, the control unit 54 measures the phase error λ between the reference timing of the mobile station and the reception timing from the base station depending on the difference between the position of the reception channel including the polling information or the like actually transmitted from the base station and the position of the assumed reception channel, and determines whether the phase error λ exceeds the preset threshold value "m". When the phase error λ exceeds the threshold value "m", the control unit 54 outputs the frequency deviation correction value calculating start signal 37*r* to the frequency deviation correction value calculation unit 37, so as to instruct that the frequency deviation correction value is calculated.

At step ST42, when the phase error λ between the reference timing of the mobile station and the reception timing from the base station exceeds the preset threshold value "m", the control unit 54 determines based on the phase error λ whether the control is made using the reception timing from the base station as the reference timing of the mobile station. When the determination is made that the control is made, the control unit 54 outputs the count control signal 54*t* for instructing the control of advancing or the control of delaying the reference timing counter to the reference timing counter unit 38 based on the phase error λ. When the control unit outputs the count control signal 54*t*, the control is given to step ST43. When the control unit 54 does not output the count control signal 54*t*, the control is given to step ST44.

At step ST43, the reference timing counter unit 38 makes control so as to load the counter value into the reference timing counter based on the input count control signal 54*t*. In the example shown in FIG. 10, since the reference timing of the mobile station advances by "4", 4 is subtracted from the count on the reference timing counter. Thereafter, the control is given to step ST44.

At step ST44, the frequency deviation correction value calculation unit 37 determines whether the frequency deviation correction value calculating start signal 37*r* is input from the control unit 54, namely, whether the frequency deviation correction value is calculated. When the execution of the calculation is instructed, the control is given to step ST45.

At step ST45, the frequency deviation correction value calculation unit 37 generates a pulse width corresponding to the 8192 clock of the low-speed clock 40*t* with 32.768 kilohertzs, and counts the pulse width using the high-frequency clock 31*t* with 30.72 megahertzs. The calculation unit 37 obtains the average frequency deviation correction value 33*t* per 1 clock of the low-speed clock depending on the difference between the count and the count number 7680000 in the case of no deviation, so as to output it to the reference timing counter unit 38. Thereafter, the control is given to step ST105.

Meanwhile, at step ST44, when the frequency deviation correction value calculating start signal 37*r* is not input from the control unit 54, the frequency deviation correction value calculation unit 37 does not calculate the correction value and the control is given to step ST105. At the time at which the intermittent reception operation is repeated, the steps ST101 to ST107 are repeated.

The timing control device of the fourth embodiment calculates the deviation between the accurate high-speed clock which is used by the mobile station at the reception time or the like at which the polling information is transmitted from the base station to its own station at the intermittent reception time and the low-speed clock with low accuracy which is used by the mobile station at the sleep time in the intermittent reception time according to the fluctuation in the frequency stability of the low-speed clock. For this reason, only when the fluctuation in the frequency stability is large, the calculation can be made. When the fluctuation in the frequency stability due to the temperature change or the like is small, the calculation of the frequency deviation of the low-speed clock can be set so as not to be executed, thereby reducing the power consumption consumed by the calculation of the correction value.

Since the reference timing position of the mobile station is corrected according to the fluctuation in the frequency stability of the low-speed clock, when the fluctuation in the frequency stability is large, the control of advancing or the control of delaying the reference timing position of the mobile station can be made. At the intermittent reception time, therefore, the timing can be maintained with higher accuracy.

The fourth embodiment explains that the reference timing position of the mobile station is corrected in the second embodiment. In the first embodiment where when the phase error λ exceeds the threshold value, the correction value calculation period varies according to a degree that the phase error λ exceeds the threshold value, and in the third embodiment where the phase error λ exceeds the threshold value continuously at a plural number of times, needless to say, the reference timing position of the mobile station can be similarly corrected, and the same effect can be obtained.

According to one aspect of the present invention, the degree of the fluctuation in the frequency stability of the low-speed clock which is necessary for complying with the fluctuation in the deviation between the high-speed clock and the low-speed clock can be detected.

According to another aspect of the present invention, the interval of the operation for obtaining the frequency deviation of the low-speed clock with respect to the high-speed clock and correcting it can be set according to the degree of the fluctuation in the frequency stability of the low-speed clock. For this reason, the calculating frequency of the frequency deviation of the low-speed clock is reduced and simultaneously the reference timing of the mobile station at the intermittent reception time can be always counted by using the low-speed clock based on the latest deviation calculated result. The power consumption consumed by the correcting calculation can be reduced.

According to still another aspect of the present invention, when the degree of the fluctuation in the frequency stability of the low-speed clock exceeds the threshold value, the deviation is again calculated, and the reference timing of the mobile station at the intermittent reception time can be counted by using the low-speed clock based on the calculated result. When the degree of the fluctuation in the frequency stability of the low-speed clock does not exceed the threshold value, the frequency deviation of the low-speed clock is not calculated, thereby reducing the power consumption consumed by the correcting calculation.

According to still another aspect of the present invention, when the degree of the fluctuation in the frequency stability of the low-speed clock exceeds the threshold value continuously at a predetermined number of times, the deviation is again calculated, and the reference timing of the mobile station at the intermittent reception timing can be counted by using the low-speed clock based on the calculated result. Even if the degree of the fluctuation in the frequency stability of the low-speed clock exceeds the threshold value, when this situation is not repeated at a predetermined number of times, the deviation between the high-speed clock and the low-speed clock is not calculated and corrected, thereby reducing the power consumption consumed by the correcting calculation.

According to still another aspect of the present invention, while the power consumption consumed by the correcting calculation is being reduced, the more accurate timing can be maintained.

According to still another aspect of the present invention, the degree of the fluctuation in the frequency stability of the low-speed clock required for complying with the fluctuation in the deviation between the high-speed clock and the low-speed clock can be detected.

According to still another aspect of the present invention, the interval of the operation for obtaining and correcting the frequency deviation of the low-speed clock with respect to the high-speed clock can be set according to the degree of the fluctuation in the frequency stability of the low-speed clock. For this reason, while the calculating frequency of the frequency deviation of the low-speed clock is being reduced, the reference timing of the mobile station at the intermittent reception time can be always counted by using the low-speed clock based on the latest deviation calculated result. As a result, the power consumption consumed by the correcting calculation can be reduced.

According to still another aspect of the present invention, when the degree of the fluctuation in the frequency stability of the low-speed clock exceeds the threshold value, the deviation is again calculated, and the reference timing of the mobile station at the intermittent reception time can be counted by using the low-speed clock based on the calculated result. When the degree of the fluctuation in the frequency stability of the low-speed clock does not exceed the threshold value, the frequency deviation of the low-speed clock is not calculated, thereby reducing the power consumption consumed by the correcting calculation.

According to still another aspect of the present invention, when the degree of the fluctuation in the frequency stability of the low-speed clock exceeds the threshold value continuously at a predetermined number of times, the deviation is again calculated, and the reference timing of the mobile station at the intermittent reception time can be counted by using the low-speed clock based on the calculated result. Even when the degree of the fluctuation in the frequency stability of the low-speed clock exceeds the threshold value, if this situation is not repeated at a predetermined number of times, the deviation between the high-speed clock and the low-speed clock is not calculated to be corrected, thereby reducing the power consumption consumed by the correcting calculation.

According to still another aspect of the present invention, while the power consumption consumed by the correcting calculation is being reduced, the more accurate timing can be maintained.

INDUSTRIAL APPLICABILITY

The timing control device and the timing control method of the present invention are suitable to be used in the mobile station which communicates with the base station in the mobile communication system.

The invention claimed is:

1. A timing control device in a mobile station which counts reference timing of the mobile station using an accurate high-speed clock at time of normal communication with a base station, and counts reference timing of the mobile station according to a low-speed clock corrected based on a deviation between the high-speed clock pre-calculated at the normal communication time and a low-speed clock with low accuracy at sleep time in intermittent reception time, so as to manage end timing of the sleep time in the intermittent reception time, comprising:
   a fluctuation detector which obtains a phase error between a detecting position of an assumed reception channel and an actually detected position of a reception channel represented by the reference timing of the mobile station counted according to the high-speed clock at the reception time via the sleep time.

2. The timing control device according to claim 1, comprising a correcting operation period set unit which sets a period in the intermittent reception operation with which the deviation is calculated and corrected so that the phase error exceeds a predetermined threshold value if the phase error obtained by the fluctuation detector exceeds the threshold value when the intermittent reception operation is repeated.

3. The timing control device according to claim 2, comprising a reference timing correcting unit which corrects the reference timing of the mobile station counted by using the high-speed clock according to the phase error when the phase error obtained by the fluctuation detector exceeds the threshold value.

4. The timing control unit according to claim 1, comprising a correcting operation instruction unit which immediately issues an instruction for starting an operation for calculating and correcting the deviation if the phase error obtained by the fluctuation detector exceeds a predetermined threshold value when the intermittent reception operation is repeated.

5. The timing control device according to claim 4, comprising a reference timing correcting unit which corrects the reference timing of the mobile station counted by using the high-speed clock according to the phase error when the phase error obtained by the fluctuation detector exceeds the threshold value.

6. The timing control device according to claim 1, comprising a correcting operation instruction unit which issues an instruction for starting an operation for calculating and correcting the deviation if the phase error obtained by the fluctuation detecting unit exceeds a predetermined threshold value continuously at a predetermined number of times when the intermittent reception operation is repeated.

7. The timing control device according to claim 6, comprising a reference timing correcting unit which corrects the reference timing of the mobile station counted by using the high-speed clock according to the phase error when the phase error obtained by the fluctuation detector exceeds the threshold value.

8. A timing control method employed in a mobile station, comprising:

counting a reference timing of the mobile station using an accurate high-speed clock at time of normal communication with a base station, and counting the reference timing of the mobile station according to a low-speed clock corrected based on a deviation of the high-speed clock pre-calculated at the normal communication time and a low-speed clock with low accuracy at sleep time in intermittent reception time, to thereby manage end timing of the sleep time in the intermittent reception time; and obtaining a phase error between a detecting position of an assumed reception channel and a position of a reception channel actually detected represented by the reference timing of the mobile station counted according to the high-speed clock at reception time via the sleep time.

9. The timing control method according to claim 8, further comprising setting a period in the intermittent reception operation in which the deviation is calculated and corrected so that the period is different according to a degree that the phase error exceeds a predetermined threshold value if the phase error obtained exceeds the threshold value when the intermittent reception operation is repeated.

10. The timing control method according to claim 9, further comprising correcting the reference timing of the mobile station counted by using the high-speed clock according to the phase error when the phase error obtained exceeds the threshold value.

11. The timing control method according to claim 8, further comprising issuing an instruction for starting an operation for calculating and correcting the deviation immediately if the phase error obtained exceeds a predetermined threshold value when the intermittent reception operation is repeated.

12. The timing control method according to claim 11, further comprising correcting the reference timing of the mobile station counted by using the high-speed clock according to the phase error when the phase error obtained exceeds the threshold value.

13. The timing control method according to claim 8, further comprising issuing an instruction for starting an operation for calculating and correcting the deviation if the phase error obtained exceeds a predetermined threshold value continuously at a predetermined number of times when the intermittent reception operation is repeated.

14. The timing control method according to claim 13, further comprising correcting the reference timing of the mobile station counted by using the high-speed clock according to the phase error when the phase error obtained exceeds the threshold value.

\* \* \* \* \*